US 9,449,427 B1

United States Patent
Baldwin et al.

(10) Patent No.: US 9,449,427 B1
(45) Date of Patent: Sep. 20, 2016

(54) INTENSITY MODELING FOR RENDERING REALISTIC IMAGES

(75) Inventors: Leo B. Baldwin, Livermore, CA (US); Volodymyr V. Ivanchenko, Mountain View, CA (US); Kenneth M. Karakotsios, San Jose, CA (US); Isaac S. Noble, Soquel, CA (US)

(73) Assignee: Amazon Technologies, Inc., Reno, NV (US)

( * ) Notice: Subject to any disclaimer, the term of this patent is extended or adjusted under 35 U.S.C. 154(b) by 679 days.

(21) Appl. No.: 13/107,749

(22) Filed: May 13, 2011

(51) Int. Cl.
*G06T 15/50* (2011.01)

(52) U.S. Cl.
CPC ........ *G06T 15/50* (2013.01); *A63F 2300/6692* (2013.01)

(58) Field of Classification Search
None
See application file for complete search history.

(56) References Cited

U.S. PATENT DOCUMENTS

| | | | |
|---|---|---|---|
| 4,914,284 A * | 4/1990 | Halldorsson et al. | 250/206.2 |
| 6,191,413 B1 * | 2/2001 | Hegyi | 250/227.11 |
| 6,392,667 B1 | 5/2002 | McKinnon et al. | |
| 6,956,566 B2 | 10/2005 | Gelb | |
| 7,033,025 B2 | 4/2006 | Winterbotham | |
| 7,104,891 B2 | 9/2006 | Osako et al. | |
| 7,359,817 B2 | 4/2008 | Ban et al. | |
| 8,238,026 B1 * | 8/2012 | Kemme et al. | 359/489.17 |
| 8,350,896 B2 | 1/2013 | Kawakami et al. | |
| 2002/0167669 A1 * | 11/2002 | Schwarz | 356/446 |
| 2004/0032409 A1 | 2/2004 | Girard | |
| 2004/0230904 A1 * | 11/2004 | Tada | 715/517 |
| 2005/0007504 A1 * | 1/2005 | Fergason | G02F 1/13318 349/14 |
| 2006/0017692 A1 | 1/2006 | Wehrenberg et al. | |
| 2006/0020898 A1 | 1/2006 | Kim et al. | |
| 2006/0038881 A1 | 2/2006 | Starkweather et al. | |
| 2007/0236485 A1 | 10/2007 | Trepte | |
| 2007/0290284 A1 * | 12/2007 | Shaffer | 257/432 |
| 2008/0069438 A1 | 3/2008 | Winn et al. | |
| 2008/0140481 A1 | 6/2008 | Gold | |
| 2008/0211813 A1 | 9/2008 | Jamwal et al. | |
| 2008/0266289 A1 | 10/2008 | Park | |
| 2009/0184981 A1 | 7/2009 | De Matos | |
| 2009/0213120 A1 * | 8/2009 | Nisper et al. | 345/426 |

(Continued)

FOREIGN PATENT DOCUMENTS

| | | |
|---|---|---|
| CN | 1727839 | 2/2006 |
| JP | 2004-271671 | 9/2004 |

(Continued)

OTHER PUBLICATIONS

US Non-Final Office Action issued in U.S. Appl. No. 13/209,243 dated Jul. 18, 2014.

(Continued)

*Primary Examiner* — Xiao Wu
*Assistant Examiner* — Steven Elbinger
(74) *Attorney, Agent, or Firm* — Polsinelli LLP

(57) ABSTRACT

An electronic device can utilize one or more sensors and/or imaging elements to determine the relative position of at least one light source relative to the device. In various embodiments, the intensity of light can be determined in various directions around the device. By determining the relative intensity around the device, an approximate direction of one or more light sources can be determined. Utilizing the relative position of each light source, the electronic device can properly light or shade a graphical object to be rendered by the device, or otherwise process image information captured by the device.

30 Claims, 7 Drawing Sheets

(56) References Cited

U.S. PATENT DOCUMENTS

| | | | |
|---|---|---|---|
| 2009/0296989 A1 | 12/2009 | Ramesh et al. | |
| 2009/0313584 A1 | 12/2009 | Kerr et al. | |
| 2010/0023878 A1 | 1/2010 | Douris et al. | |
| 2010/0079426 A1* | 4/2010 | Pance et al. | 345/207 |
| 2010/0103172 A1 | 4/2010 | Purdy | |
| 2010/0125816 A1 | 5/2010 | Bezos | |
| 2010/0225743 A1 | 9/2010 | Florencio et al. | |
| 2010/0283998 A1* | 11/2010 | Souchkov et al. | 356/141.2 |
| 2011/0063295 A1* | 3/2011 | Kuo et al. | 345/426 |
| 2011/0145718 A1 | 6/2011 | Ketola et al. | |
| 2011/0221667 A1 | 9/2011 | Lee | |
| 2011/0243388 A1 | 10/2011 | Sakaguchi et al. | |
| 2011/0292078 A1* | 12/2011 | Lapstun et al. | 345/632 |
| 2012/0069020 A1* | 3/2012 | Smith-Casem | G06T 15/08 345/426 |

FOREIGN PATENT DOCUMENTS

| | | |
|---|---|---|
| JP | 2008-516352 | 5/2008 |
| JP | 2008-129775 | 6/2008 |
| JP | 2010-122879 | 6/2010 |

OTHER PUBLICATIONS

US Final Office Action issued in U.S. Appl. No. 13/209,243 dated Mar. 27, 2014.

US Non-Final Office Action issued in U.S. Appl. No. 13/209,243 dated Dec. 5, 2013.

US Final Office Action issued in U.S. Appl. No. 13/209,243 dated Jul. 19, 2013.

US Non-Final Office Action issued in U.S. Appl. No. 13/209,243 dated Jan. 16, 2013.

International Search Report and Written Opinion issued in PCT No. PCT/US12/46518 dated Oct. 2, 2012.

* cited by examiner

INTENSITY MODELING FOR RENDERING REALISTIC IMAGES

BACKGROUND

People are utilizing electronic devices, particularly portable electronic devices, for an increasing number and variety of tasks. In many instances, these electronic devices provide increasingly realistic images and video and in some instances even present three-dimensional views. Often, however, the realism of the generated or displayed image is limited by the information available to the device. For example, a device might render an image using predetermined lighting approach with shadowing performed from a specific angle. Other devices or applications might render graphical information using a first lighting approach when that image is viewed during daylight hours at a current location of the device and a second lighting approach when that image is instead viewed during night-time hours. Such lighting approaches do not, however, take into account the actual lighting around the device. If the device is attempting to display a realistic image in the present location, for example, the device does not properly light and/or shade the image based on ambient lighting conditions. For example, in known systems, where the device is capturing an image of a person and wants to overlay a digital outfit or other such image information over the person's image, the overlay will likely not blend well with the image of the person. This can be caused by the rendered image and overlay not representing the actual lighting around the device.

BRIEF DESCRIPTION OF THE DRAWINGS

Various embodiments in accordance with the present disclosure will be described with reference to the drawings, in which.

DETAILED DESCRIPTION

Figure 1:
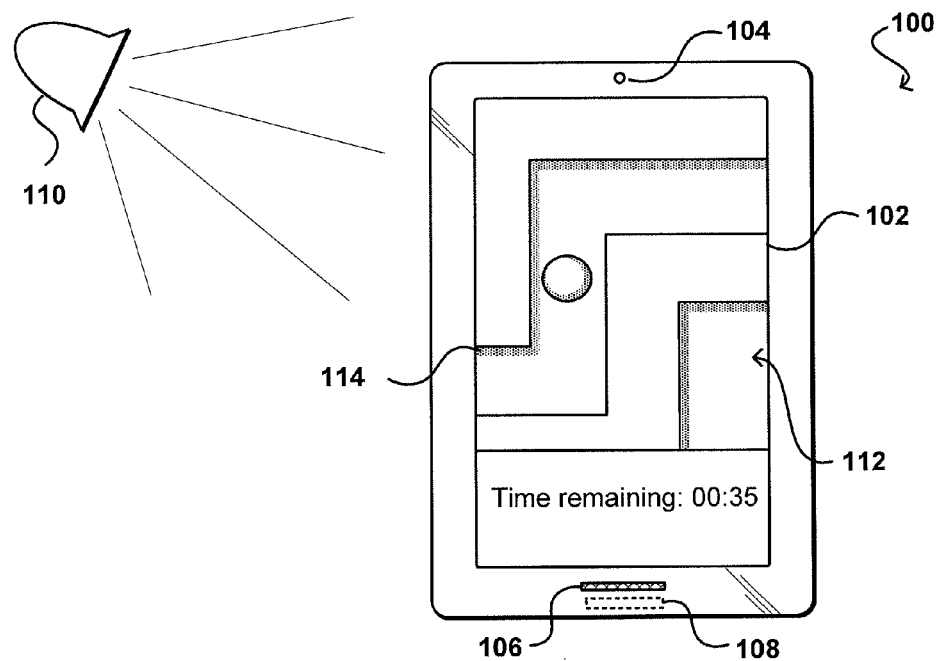
FIG. 1 illustrates an example display on an electronic device that accounts for nearby lighting that can be used in accordance with various embodiments.

Systems and methods in accordance with various embodiments of the present disclosure overcome one or more of the above-referenced and other deficiencies in conventional approaches of processing and/or displaying graphical content on an electronic device. In particular, various embodiments provide for the determination of a relative position of at least one light source detectable by an electronic device. By determining the relative position of the light source, the electronic device (or another device, service or process) can render or otherwise process graphical elements based at least in part upon the lighting and/or shading that would result from a light source at that location. Images or other graphical elements displayed on a device can be enhanced with virtual shadows, for example, that are rendered according to the determined location of the ambient (or other) light surrounding the device.

In one example, an electronic device might capture an image of at least one object within a viewable area of a camera of the device. In rendering the object for display on the electronic device, a determined position of a light source emitting light onto the electronic device can be used to properly light and/or shade the graphical element such that the displayed image appears more realistic to the user, as the object lighting and/or shading is virtually the same as if the object was being illuminated by the actual light source at the determined location. For example, if an image of a ball was captured and rendered on a user's tablet computer where the light source was determined to be on the left side of the ball, the present system would render the ball to include more light on the left side of the ball and more shading or shadow on the right side of the ball. Similarly, if a user or application of the electronic device attempts to overlay a graphical element on the object image to appear to be a part of the original image, the overlay would also include the proper lighting and/or shading as that graphical element would be lighted by the light source. If the object is not a captured image but instead a rendered image, such as an element of a video game or media file, the position of the light source can be used to light and/or shade the object such that the object appears more realistic. Various other applications and services can utilize the determined position of a light source for other purposes as well, as discussed and suggested elsewhere herein.

In at least some embodiments, an occlusion (or obfuscation) is utilized with a sensor in order to generate a detectable shadow. The occlusion can comprise, for example, an elongated bar, a paint marker, a plastic disc, a printed symbol or another other such element that can be positioned relative to a light sensor or other imaging object. As described below in more detail, by knowing the relative position and/or separation of the occlusion with respect to the sensor, a vector calculation or other such process can be used to determine the approximate direction from which the light source is projecting (referred to herein as "projection direction") based on the position of the shadow cast by the occlusion on the sensor.

If the electronic device has at least two sensors or imaging elements each capable of making such a projection direction determination, the information from the multiple sensors can be utilized to determine a position of the light source in relation to the electronic device in three dimensions, such that a distance, as well as a relative projection direction, of each light source can be determined. Such an approach enables a three-dimensional lighting model to be developed which can be used to render graphical elements. In many cases, the object or element being rendered or processed by the electronic device will be at some distance from the actual device (either physically or virtually). By knowing the position of the object relative to the light source in three dimensions, the object rendered by the electronic device can be illuminated and/or shaded based on the projection direction of the light source relative to the object itself, and not necessarily based on the projection direction of the light source relative to the electronic device.

Various other approaches can be used to determine the relative projection direction of a light source in accordance with other embodiments. For example, a device can utilize a number of different light paths to obtain intensity information from various directions. By analyzing the relative intensity from each direction, the device can generate a three-dimensional lighting model, or at least determine the approximate direction of at least one light source. The paths can be provided using any appropriate element, such as optical fibers or transmissive apertures as described below.

In addition to determining projection direction of one or more light sources, various approaches may also be used to determine a type of light source projecting light. For example, penumbral blur of a shadow cast on the sensor by an occlusion can be used to determine whether the light source is a point light source, such as a light emitting diode (LED) or a non-point light source, such as the sun. Penumbral blurring is primarily a function of two variables: the angular extent of the light source, and the distance between the casting object (in this description the occlusion) and the surface on which the shadow is cast. Penumbral blur increases as the light source is made larger or the occlusion object is moved away from the surface. By determining the penumbral blur of the occlusion shadow cast on the sensor a similar blurring can be applied to shadows rendered by various embodiments described herein.

The ability to determine positions and types of various light sources relative to objects rendered by the electronic device also can assist with other applications as well. For example, shadows can be removed from images that are captured by a device. The ability to remove shadowing can be used to improve image quality as well as assist with processes such as facial recognition and image analysis.

Various other applications, processes and uses are presented below with respect to the various embodiments.

FIG. 1 illustrates a front view of an example electronic device 100 that can be used in accordance with various embodiments. Although a portable computing device (e.g., a cell phone, an electronic book reader or tablet computer) is shown, it should be understood that any electronic device capable of receiving and processing input, or at least capable of rendering and/or displaying visual content, can be used in accordance with various embodiments discussed herein. Example devices can also include, for example, desktop computers, notebook computers, personal data assistants, smart phones, video gaming consoles, television set top boxes and portable media players. In this example, the user device 100 has a display element 102 on what will be referred to herein as the "front" side, although for certain devices or applications this side might act as a "back" side. The terms "front" and "back" generally are not intended to infer a direction at all, but merely refer to opposing sides of the device for simplicity of explanation. In this example, the display element 102 will display information, under normal operation, to a user facing the display element (e.g., on the same side of the computing device as the display element). The display element in this example can be any appropriate element capable of displaying image or video content, as may include a high color, high refresh liquid crystal display (LCD) or other such element. In this example, the display element 102 can also be touch sensitive, enabling a user to provide input by applying pressure to, or at least coming into contact with, at least one position of the display element. Many touch screens are known in the art that can be used with such a display in accordance with some embodiments, such that they will not be described in detail herein.

The electronic device 100 can have a number of other input mechanisms, such as at least one front image capture element 104 positioned on the front of the device and at least one back image capture element (not shown) positioned on the back of the device such that, with sufficient lenses and/or optics, the user device 100 is able to capture image information in substantially any direction about the computing device. The electronic device 100 can also include at least one microphone 106 or other audio capture device capable of capturing audio data, such as words spoken by a user of the device. The example device also includes at least one position and/or orientation determining element 108. Such an element can include, for example, an accelerometer or gyroscope operable to detect an orientation and/or change in orientation of the user device 100. An orientation determining element also can include an electronic or digital compass, which can indicate a direction (e.g., north or south) in which the device is determined to be pointing (e.g., with respect to a primary axis or other such aspect). A location determining element also can include or comprise a global positioning system (GPS) or similar positioning element operable to determine relative coordinates for a position of the computing device. Various embodiments can include one or more such elements in any appropriate combination. As should be understood, the algorithms or mechanisms used for determining relative position and/or orientation can depend at least in part upon the selection of elements available to the device.

In the example of FIG. 1, illustrated from the perspective of a user looking at device 100, the display element 102 is displaying a two-dimensional representation 112 of a three-dimensional maze, wherein a user attempts to guide a marble through the maze. It should be understood that the device could also display such an image using a three-dimensional representation in various embodiments. As illustrated in FIG. 1, the device 100 is able to render an image with lighting and/or shadows representative of current lighting about the device. In this example situation, the device is in a room with a single light source 110 coming from the right of the device (in the figure). If the device is able to determine the approximate relative position/location of the light source 110 relative to itself, the device 100 can render shadows on the maze structure (e.g., representing walls of the maze) rendered in the display such that the rendered shadows 114 are representative of the current location of the light source 110 (left side of the device and slightly above a centerline of the device) relative to the device 100. In some embodiments, a device is able to use at least one camera 104 on a side of the device that is able to determine the approximate location or projection direction of a primary light source, such as by performing image analysis on at least one captured image.

Figure 2:
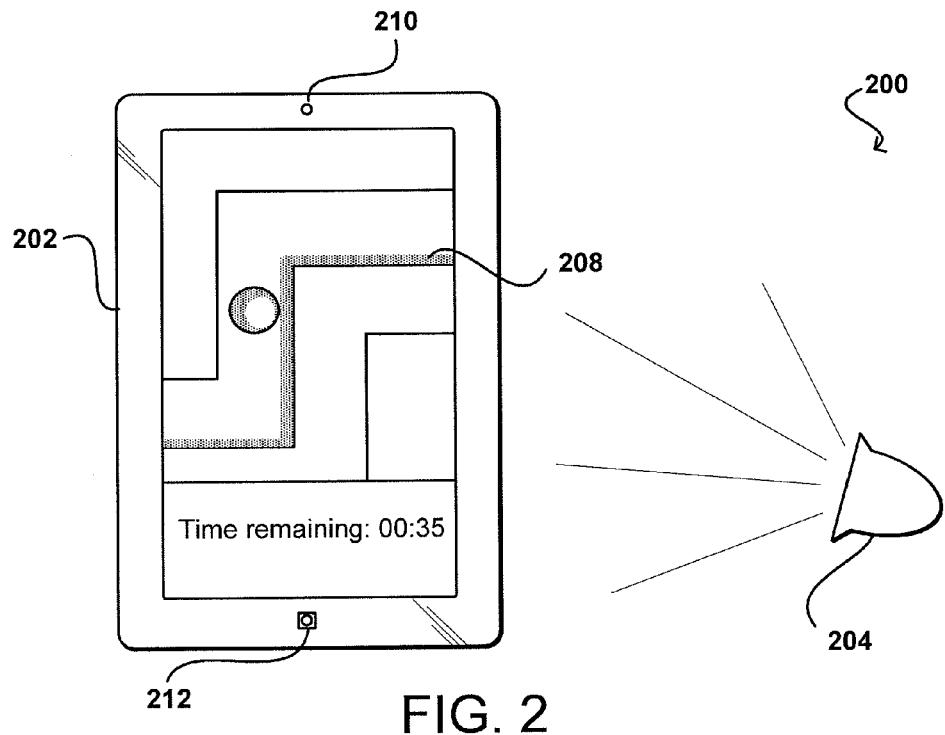
FIG. 2 illustrates an example display on an electronic device that accounts for nearby lighting that can be used in accordance with various embodiments.

FIG. 2 illustrates another example situation 200 wherein a device 202, such as that described with respect to FIG. 1, is able to render an image with lighting and/or shadows when current lighting about the device 202 has changed compared to that of FIG. 1. In this example situation, the device is in a room with a single light source 204 that is in a different location, coming from the right of the device, than the light source 110 of FIG. 1. By determining the approximate location of the light source 204 relative to itself, device 202 can render shadows on the maze structure (e.g., representing walls of the maze) rendered in the display such that the rendered shadows 208 are representative of the current location of the light source 204 (right side of the device and slightly below a centerline of the device) based on the current orientation of the device 202 relative to the light source 204. As can be seen by the comparison of FIG. 1 and FIG. 2, while the maze is rendered in each, the shadowing/lighting of the walls have been adjusted to reflect the lighting conditions about the device to make the image appear more realistic.

In some embodiments, a device is able to use at least one camera 210 to determine the approximate location or projection direction of a primary light source, such as by performing image analysis on at least one captured image. In order to improve the realism of the shading, the device can utilize at least a second camera 212 and also determine the relative location/position of the light source from a second position. By combining the position/location of the light source as determined by the first camera 210 and second camera 212, the device 200 may be used to determine a three-dimensional location of the light source 204. As will be discussed later herein, the ability to determine a position of a light source relative to the device in three dimensions enables lighting, shading and glint to be applied properly to an image where an object in the image appears to be located at a distance from the device, such that the lighting might be different on the object than on the device.

There can be various problems or disadvantages, however, to attempting to determine light position using standard image analysis. For example, a sensor might be oversaturated when capturing an image that includes the light source, which prevents the sensor from capturing an accurate image. Further, the captured image might show multiple white regions, only one of which corresponds to an actual light source, and it can be difficult for the device to distinguish between, or properly interpret, those regions. Further, a light source that illuminates a device and/or imaged object might not actually be captured in the field of view of a camera at the current orientation. As described herein, various embodiments overcome these identified problems and disadvantages.

Figure 3A:
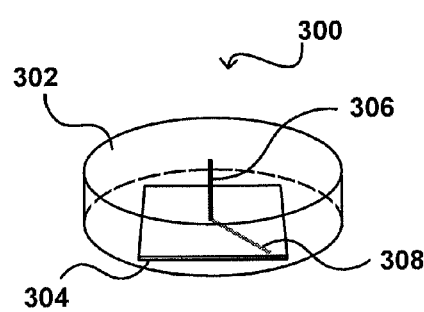
FIGS. 3(a), (b) and (c) illustrate example approaches of providing occlusions with an imaging sensor to determine lighting directions in accordance with various embodiments.
Figure 3B:
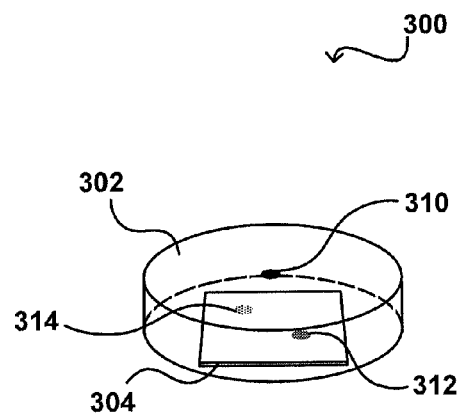
Figure 3C:
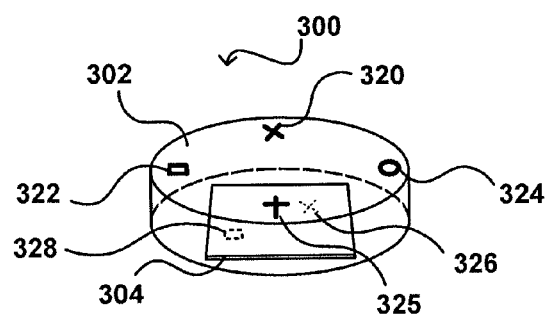

FIGS. 3(a)-3(c) illustrate examples of sensors and/or sensor assemblies 300 that can be used in accordance with various embodiments to determine the approximate direction and/or location of one or more light sources around a device. In this example, a sensor 304 is able to capture light using, for example, an array of pixels. The sensor can capture intensity, color and/or other such aspects of visible light or other radiation (e.g., infrared radiation) incident on, or otherwise directed to, the sensor. In one embodiment, the sensor 304 can be positioned relative to a lens element 302, which can be a focusing lens, glass plate, transparent plastic disc or other such element capable of transmitting light while protecting the sensor from scratches, debris, or other potential damage by being otherwise exposed. As mentioned above, an electronic device can have one or more such sensors that are each capable of capturing light from at least one direction, or range of directions, around the device. The sensor 300 in FIG. 3(a) could be, for example, a portion of the camera 104 illustrated in FIG. 1.

In FIG. 3(a), a bar, member, needle or other elongated element 306 can be positioned orthogonal to a primary plane of the sensor 304. In some embodiments, element 306 can be a plastic or metal rod embedded in the transparent cover or lens or positioned between the sensor and such a lens element. In this example the elongated element 306 is positioned proximate a center of the sensor 304, while in other embodiments the elongated element 306 could be positioned at other locations relative to the sensor, separated a distance from the sensor, etc. In still other embodiments, there could be multiple elongated elements positioned at different locations with respect to the sensor. When light is incident on the elongated member 306, the light will cast a shadow 308 across a portion of the sensor (unless the light is axially aligned with the elongated member, is not itself incident on the sensor, etc.). Measuring or determining the output from sensor 304, a direction of the shadow may be determined. By determining a direction of the shadow 308 on the sensor 304, the device can determine an approximate direction of the light source (at least within a plane of the sensor). If the length of the shadow can also be determined, a measure of the direction of the light in three-dimensional space can be determined.

The position of the shadow can be determined using any appropriate image or intensity analysis algorithm. For example, an algorithm can be executed on an image captured using the sensor, wherein the algorithm attempts to locate drops or reductions in intensity level over a region corresponding in size, shape and/or position of an occlusion creating the shadow, here the elongated element. In some embodiments, the algorithm can begin analyzing the image at the location of the elongated element in an attempt to more quickly determine the direction and thus reduce the amount of the image that must be processed. In some embodiments, only a portion of the shadow is analyzed until the direction can be determined within a reasonable amount of certainty. In some embodiments, a shadow direction is only determined/registered when there is a minimum level of intensity variation corresponding to the shadow. Various other determinations can be utilized as well within the scope of the various embodiments.

FIG. 3(b) illustrates the example sensor assembly 300 with a different type of occlusion. In this example, a single "dot" 310 or other such feature or marker is painted on, adhered to, activated, embedded in or otherwise positioned relative to the sensor assembly. In this example, the marker is positioned at a distance from the sensor 304 at a fixed position approximately co-planar with the upper protective surface 302. The marker can be made of any appropriate material, such as paint or a sticker attached to, or printed on, the sensor assembly or a plastic or other such member attached to, or formed in, the sensor assembly 300. In other embodiments, the marker 310 may be selectively activated such that it can be activated by the device so that it is at least partially opaque such that it casts a shadow on the sensor. When not activated, the marker 310 may be transparent. In still further embodiments, the marker 310 may be movable such that it can be activated at one or more selected positions on the protective surface 302 with respect to the sensor 304. Further, although illustrated as a rounded disc or hemispherical element, it should be understood that the marker can have any appropriate shape, such as may help to more easily determine a location of a shadow formed by the marker. Similar to the elongated member 306 in FIG. 3(a), the marker 310 can help to determine the relative direction of a light source by casting at least one shadow 312 on an area of the sensor 304, which then can be used with the distance to the marker and the distance from the center of the sensor to calculate an approximate direction of the light source.

There are certain advantages to using a smaller occlusion. For example, the reduced size of the occlusion also reduces the amount of the view of the sensor (e.g., camera) that is potentially blocked by the occlusion. Further, a point occlusion can give a more accurate indication of the direction of the light source, as an elongated member will cast an elongated shadow rather than a quasi-point shadow. A benefit to an elongated member, however, is that light from an oblique angle can still cast a shadow on the sensor even if the shadow from the end of the member falls outside the region of the sensor. For a dot-like occlusion, light at oblique angles can cause the shadow to fall outside the area of the sensor, which then can prevent calculation of the light direction based on the shadow.

As illustrated in FIG. 3(b), an occlusion 310 can also result in multiple shadows 312, 314 on the sensor 304 when there is light incident on the occlusion from multiple sources and/or directions (including, for example, light from a single source that is reflected from a different direction). The positions of each shadow can be used to determine the relative location of each source. Further, the relative differences in variation between shadows can also give an indication of the relative intensity of each source. For example, shadow 312 is shown to be "darker" in FIG. 3(b) than shadow 314. This can indicate that the light source generating shadow 312 is likely more intense (at least at this location) than the light source generating shadow 314. Further, the relative "darkness" of each shadow can be an indication of the relative intensities of those light sources, as a shadow that is twice as "dark" as another shadow might correspond to a light source that is approximately twice as intense (locally) as the second source. It should be understood, however, that factors such as the size of the occlusion and distance between the occlusion and sensor can affect the intensity values as well. For example, a large occlusion blocking light from a single light source can cast a shadow on a nearby sensor that blocks out almost all of the light at a central region of the shadow. A small occlusion that is further away from the sensor might not show the same level of darkness for the same light source, due at least in part to the refractive nature of light.

FIG. 3(c) illustrates an example wherein there are multiple occlusions 320, 322, 324, 325 positioned relative to the sensor 304. In order to avoid blocking a portion of the field of view of the sensor with an occlusion, approaches in accordance with various embodiments position the occlusion(s) outside the field of view, such as near a periphery of the assembly 300. A downside to moving an occlusion towards an edge, however, is that the effective range detection for a light source is adjusted to one side, such that some information will be lost for more oblique angles. An approach illustrated in FIG. 3(c) is to utilize multiple occlusions positioned outside, or at least near an edge of, the field of view of the sensor 304. Using such an approach, light from the right (in the plane of the figure) might cast a shadow from occlusion 322 that falls off the sensor 304, but that same light likely would, over at least a given range, cast a shadow from occlusion 324 that would fall on the sensor. Thus, using multiple occlusions can increase the likelihood that at least one shadow will fall onto the sensor.

If a single shadow falls on the sensor, however, it can be difficult to determine, in at least some situations, which occlusion corresponds to the shadow. For example, in an arrangement such as that in FIG. 3(c) wherein there are four occlusions spaced relatively evenly about the sensor assembly 300, if there is a single shadow detected near the center of the sensor, it can be difficult to determine which occlusion generated the shadow. Accordingly, the occlusions in FIG. 3(c) each have a unique shape that can help to associate a shadow with a particular occlusion. In this example, it can easily be determined that the shape of shadow 326 corresponds to occlusion 320, and the shape of shadow 328 corresponds to occlusion 322. The shadow generated from occlusions 324 and 325, for example, falls off the sensor 304 and cannot be detected by that sensor.

If the sensor is large enough and/or the resolution high enough, the use of multiple occlusions can also help to calculate the direction of the light source in three dimensions. For example, the ray from a point light source will be incident at each occlusion at a slightly different angle. If the sensor assembly is able to detect this difference, the device can determine the distance to the light source in addition to the direction in two dimensions, as determined using the planar sensor. In some embodiments, a single moving occlusion can be used that is only in the field of view when the sensor is being used for light detection, for example, and the change in angle of the shadow with respect to the occlusion as the occlusion moves across the sensor, or appears at different locations, can be used to determine distance to the light source.

In some embodiments, the number of occlusions is increased, or spacing between occlusions adjusted, such that different shapes are not needed. For example, if the occlusions are in a ring-based orientation about the periphery, then the shadows that are cast will form a portion of a ring that can be used to determine which occlusions are forming the shadows and thus the direction of the light. In some embodiments, a single ring can be used about a periphery of the assembly that will form a portion of a ring-shaped shadow on the sensor over a range of angles, such that the direction of the light source can be determined without blocking the field of view or requiring more complex image analysis for pattern matching or other such aspects.

In approaches such as those illustrated in FIGS. 3(a)-3(c) wherein the occlusion blocks a portion of the field of view, the occlusion can be captured in any image taken by the sensor. In situations where the occlusion blocks a portion of a captured image, the occlusion can be removed from the image in a number of different ways. For example, one or more image processing algorithms can attempt to remove the blocked area by analyzing the areas around the occlusion and infer or interpolate the contents of the blocked area. If the device has multiple sensors (e.g., cameras) and at least one other sensor is able to capture an image of that area, the images can be combined using an appropriate algorithm such that the missing information due to the occlusion can be filled in using information captured by the other sensor(s).

In embodiments where the occlusion is selectively activated, the sensor may take two successive images, one with the occlusion and one without. The image with the occlusion can be used to determine the projection direction of the light source while the image without the occlusion can be used for rendering. In other embodiments, the occlusion may not be completely opaque, thereby improving the ability to reconstruct an image as the cast shadow also includes some information from the image itself. In such an embodiment, the opacity of the occlusion may be altered to determine the relative intensity of the light source, in addition to the projection direction. In other embodiments, the occlusion may only be opaque in one or more color, frequency, intensity and/or spectrum. For example, a filter may be utilized as the occlusion such that it is opaque in blue color so that light information of an object in the green and red color passes through the occlusion to the sensor. The shadow cast in the blue color can be used to determine the projection direction while the information in the other colors can be used to render the image. In addition, by utilizing information in adjacent pixels, the blue color can be reconstructed for rendering. Various other approaches can be used as well within the scope of the various embodiments. It will be appreciated that occlusions may also be generated using any type of filter and not just a color filter. Filters in any light spectrum may be utilized to generate an occlusion that can be used to determine a projection direction of a light source.

Figure 4A:
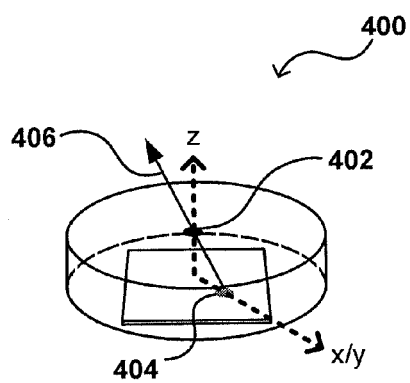
FIGS. 4(a) and (b) illustrate an example approach of determining a direction from which to light and/or shade a rendered object that can be used in accordance with various embodiments.
Figure 4B:
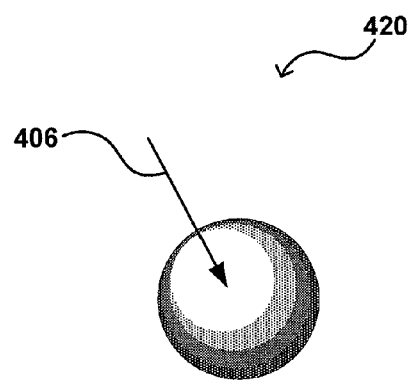

As mentioned, it can be desirable in at least some embodiments to utilize an occlusion that gives three-dimensional information regarding a position of a light source. As illustrated in the situation 400 of FIG. 4(*a*), knowing only the difference in position of the shadow on the sensor from a neutral position (e.g., for incident light orthogonal to the sensor that casts a shadow in the center of the sensor) can give only directional information in a plane, such as along the x/y vector for the position of the shadow 404. A similar result would be obtained from an elongated member when the end of the occlusion is not able to be determined from the shadow. In order to get three-dimensional information, a distance along an orthogonal direction (e.g., z in the figure) between the sensor and the occlusion 402 can be used to determine the relative projection direction of the light source. In one example, a centroid of the shadow 404 on the sensor is calculated and compared with a known center position of the occlusion 402. By calculating a vector passing through both the centroid and the occlusion center point, the direction to the light source can be determined in three dimensions. As illustrated in the example 420 of FIG. 4(*b*), the direction 406 to the light source can be utilized (and reversed where necessary) to light and/or create shadows on an object to be rendered on the device. If the direction is only obtained in two dimensions, such as in the plane of the sensor in FIG. 4(*a*), then the sphere in FIG. 4(*b*) would generally be lighted from a direction along the "equator" line of the sphere. By knowing the third dimension information, the sphere can be lighted from a direction corresponding more closely to the actual position of the light source relative to the device.

As discussed, the ability to render images with realistic lighting and shading can be desirable in a number of different situations. In the example of FIGS. 1 and 2, a completely rendered image as part of a game can appear more realistic when the lighting and shadows in the game correspond to the lighting and shadows surrounding the device. Particularly for 3D gaming, the ability to light the objects in the display according to the current light gives the enhanced sense that the user is actually playing a 3D game. For games such as a virtual pet presented with 3D graphics, the sense that there is an actual pet to interact with can be enhanced using lighting consistent with the surroundings.

Further, graphical elements or overlays added to captured (or rendered) images or video can be improved by ensuring that those additions match the lighting of the image or video. For example, FIG. 5(*a*) illustrates an example situation wherein a device 500 is displaying an image of two people 506, 508 having a conversation. This image can be rendered using 3D modeling, for example, or can be captured using a video camera (not shown) on the back of the device 500 and facing the people 506, 508. A sensor assembly 504 on the device can determine the direction 502 of the primary light source using any method disclosed or suggested herein.

Figure 5A:
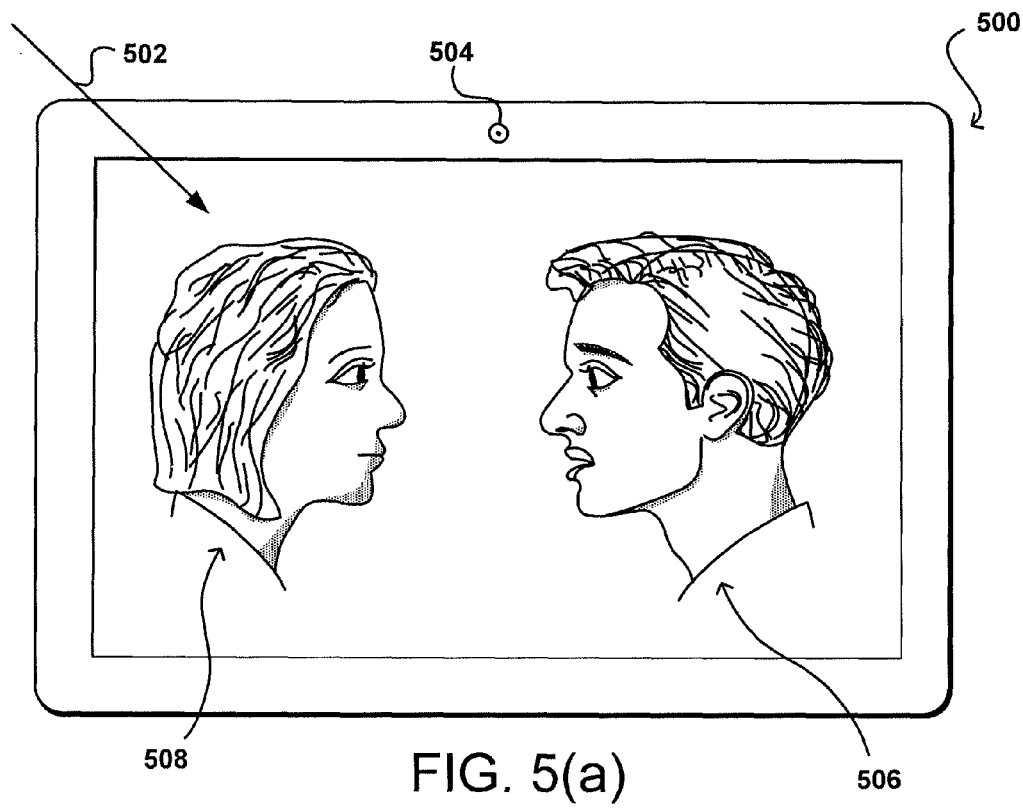
FIGS. 5(a) and (b) illustrate an example rendering including appropriate shading that can be used in accordance with various embodiments.
Figure 5B:
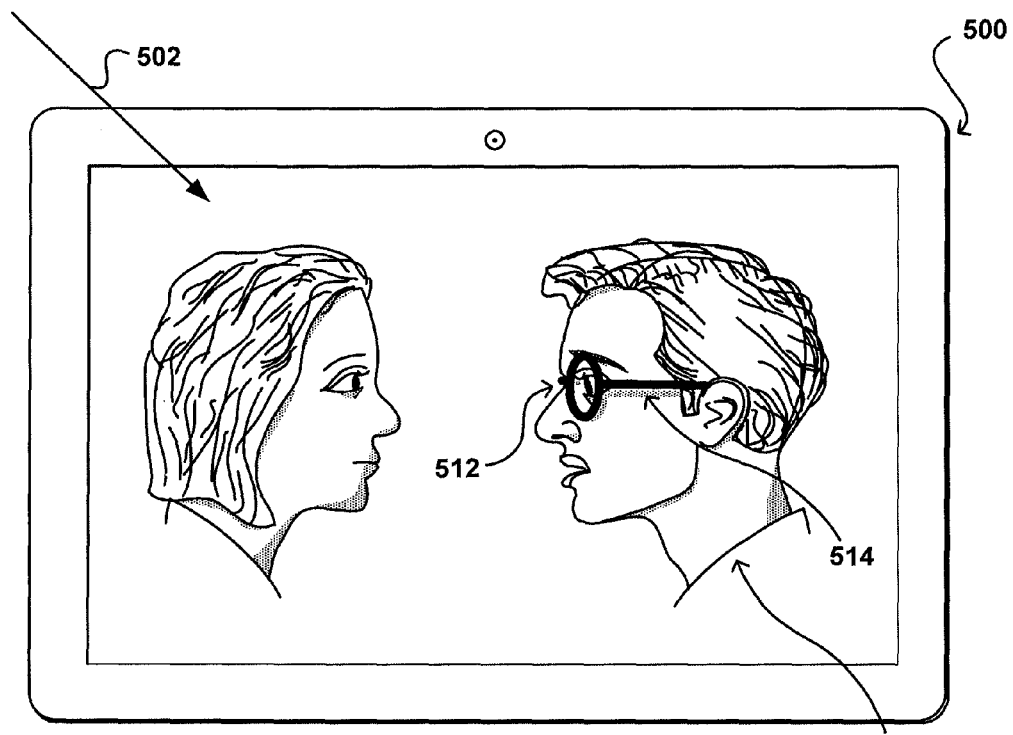

In one application, a user might have the ability to overlay graphical content on the captured (or rendered) image. In this example, as illustrated in FIG. 5(*b*), the device 500 renders a pair of glasses 512 on one of the people 506 in the conversation. It should be understood, however, that any appropriate type of information, such as costumes, text, video, thought bubbles, skins, clothing or other such content can be overlaid on such an image as well. Because the displayed image is shaded by the light source, either by actual people being lit by the source or an image being rendered based on the source, simply overlaying a graphical image without corresponding shading can make it apparent that the overlay is not actually part of the original image. In FIG. 5(*b*), however, the glasses 512 that are rendered are shaded 514 from the determined projection direction 502 of the actual light source (with respect to device 500), such that it can appear more likely that the person is actually wearing the glasses or that the glasses were part of the originally rendered image. In addition, an appropriate penumbral blur may be applied to the shading 514 so they appear similar to other shadows rendered in the image.

In addition to shading based on the determined projection direction of the light source, embodiments may also generate glint on the rendered objects based on the determined projection direction of the light source. In these embodiments, it may also determine the type of objection onto which glint is applied. For example, the device may determine if the object is a human eye, glass, metal, etc. and apply an appropriate level and representation of glint to the object. As illustrated in FIG. 5(*b*), glint (not shown) may be rendered on the lens of the glasses 512 to further improve the realistic impression of the rendered object.

Figure 6:
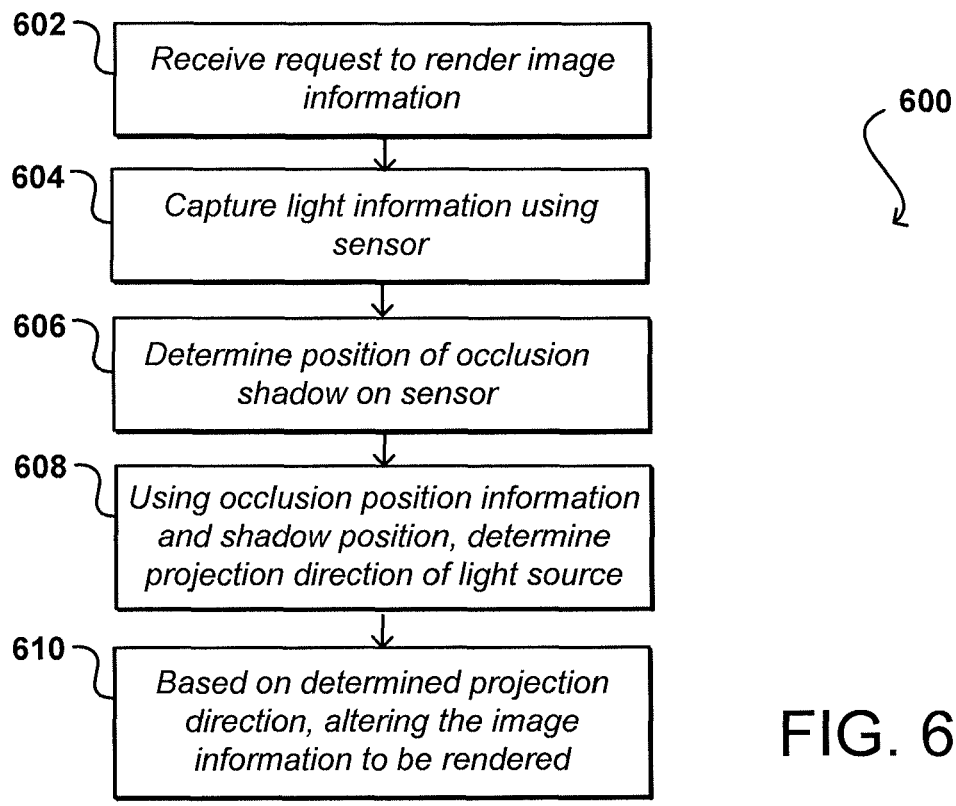
FIG. 6 illustrates an example process for determining a direction from which to light and/or shade a rendered object that can be used in accordance with various embodiments.

FIG. 6 illustrates an example process 600 for determining a relative projection direction of a light source and altering image information for one or more display elements based on that relative projection direction that can be used in accordance with various embodiments. This example includes one occlusion and one light source, but it should be understood that at least some of these steps can be expanded as discussed elsewhere herein to include multiple occlusions and/or light sources. Further, for this and any other process discussed herein, there can be additional, fewer or alternative steps performed in similar or alternative orders, or in parallel, within the scope of the various embodiments unless otherwise stated.

At a time prior to the example process 600, an occlusion is positioned relative to a sensor and an orientation between the occlusion and the sensor can be determined. As discussed, this can include any appropriate type of occlusion positioned with respect to a sensor such that over a range of incident light, the occlusion will cast a shadow on at least a portion of the sensor. Positioning and orientation can include, for example, determining the location on the sensor corresponding to the center point of the occlusion based on an imaginary line placed orthogonal to the primary plane of the sensor, as well as the separation between the occlusion and the sensor along that line. This information then can be stored in an appropriate location, such as to permanent storage on the electronic device associated with the sensor.

During operation of the device, as illustrated in the example process 600, a request can be received to render image information using a display element of the device 602. This image information can include, for example, graphical content corresponding to a two- or three-dimensional model to be added to, overlaid or rendered as part of an image. At around the time in which the image information is to be rendered, the sensor can attempt to capture lighting information 604, including light incident on the device from at least one light source. This may include activating the occlusion such that its shadow will be cast on the sensor. The device can analyze the captured lighting information to attempt to locate at least one shadow in the captured light information and determine a position where that shadow was cast on the capturing sensor by the occlusion 606. Once determined, the shadow position and the relative position of the occlusion to the sensor can be used to calculate and/or determine the approximate projection direction, type of light source (e.g., point or non-point) and/or position of the light source responsible for the shadow 608. Based on the determined projection direction of the light source, a lighting and/or shading process can be applied to the image content to be rendered such that the content appears to the user as if the content was being lit by the determined light source 610. As part of the lighting or shading process, the appropriate penumbral blur may be applied such that the lighting and shading added by the process 600 matches that of other lighting or shading included in the image. In other examples, glint may also be applied as part of the lighting or shading process 600 to further increase the realistic nature of the rendered image.

As mentioned above, it can be desirable in at least some embodiments to attempt to determine the actual location of the light source relative to the device, as opposed to determining only the projection direction of the light source. For example, consider the situation wherein light from a source is incident on a device along a given direction, and the projection direction of the light source can be used to illuminate some aspect of the object to be rendered or otherwise displayed on a display element of the device. In such an example, the lighting, shading and/or glint effect on the object might be significantly different for a person viewing the device head on in comparison to a person viewing the device from another location as their perspective of the object is different at each position. Thus, simply determining the relative projection direction of a light source may not be sufficient for lighting in all circumstances. Similarly, only determining the relative projection direction of the light source from the device may not be sufficient, as it may make the object appear as if the object were lighted along a fixed direction, which would be significantly different than if the object were lighted from the actual relative position.

Figure 7:
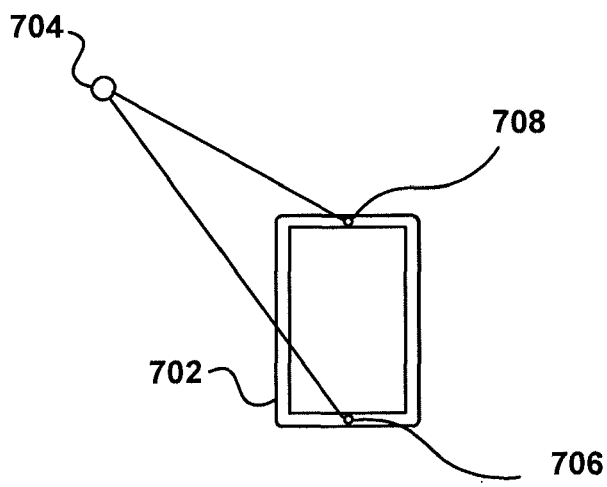
FIG. 7 illustrates an example including appropriate shading based upon distance determinations that can be used in accordance with various embodiments.

FIG. 7 illustrates an attempt to determine the distance to the light source 704, in addition to the relative projection direction. In this example, the device 702 utilizes two cameras or sensors 706, 708 that are sufficiently spaced apart on the device to capture light from a light source at two differentiable angles (up to a given distance to the light source). It should be understood that when the light source 704 is far enough away that there is no discernable difference between light incident on both cameras 706, 708, the distance of the light source can be estimated to be any distance past the point at which the angles are no longer discernable, as the lighting effect beyond that point will not change by a detectable amount. By using a parallax-based approach, the relative projection directions from the source captured by the cameras can be combined to calculate the distance to the light source, which also gives the approximate relative position in three dimensions. By also calculating (or knowing) the relative position of the image content to be rendered, a three-dimensional algorithm can be used to determine how to properly light, shade and/or glint the image content based on that light source. In some devices, dedicated lighting sensors can be used separately from any cameras intended to capture images as input to the device. In other devices, the location of the occlusion can be offset in each camera such that the effect of the occlusion can be removed from any image as long as that image is captured by at least two cameras.

In some embodiments, the occlusion can be turned on and off based upon the current mode of operation, orientation of the device or other such aspects. For example, if a camera is being used to take a picture, the occlusion might be turned off. A camera on the other side used to determine lighting and shadows, however, might have the occlusion turned on. In other examples, the occlusion may be activated when an accelerometer or orientation element detects that the object has moved a predetermined amount such that the projection direction of the surrounding light source(s) should be re-determined. In a gaming mode where everything is being rendered by the device, the occlusion might be activated for each sensor (e.g., camera). If the device is overlaying graphics over a captured video, the camera capturing the video might have the occlusion deactivated, while at least one other camera used for capturing lighting information might have the occlusion activated. While some occlusions might be activated by moving parts or other mechanical approaches, in some embodiments a number of pixels might be activated, such as in an electronic-ink type display, in order to provide an occlusion when needed. Various other such approaches can be utilized as well within the scope of the various embodiments.

In some embodiments, an occlusion might not be needed to determine the shadow direction. For example, a device can have a button or indentation (e.g., a speaker area or recessed input) that will provide some indication of the projection direction of the incoming light based upon the shadows created by those features. If the device has one or more cameras (e.g., with wide-angle or fisheye lenses) that are able to image such a feature, the device can utilize those inputs to attempt to determine the projection direction of at least a primary light source. In some devices, a camera can attempt to analyze the shadow on a lip, edge or other such area around the periphery of the camera lens to attempt to detect a projection direction of incident light. Various other such components can be utilized as well for such purposes.

As discussed, determining a projection direction or relative position of at least one light source can help to more accurately render any of a number of different types of graphical elements displayed or otherwise presented by an electronic device. As described above, such an approach can enable a game or other rendered video presentation to appear to be more realistic, as the lighting or shading of the graphical elements can match the lighting or shading if the element were actually a physical element in the vicinity of the user or device, for example. Similarly, if a user is capturing video of objects (e.g., people) near the device, the device can overlay graphical elements on top of the image of the those objects with a similar shading, blur and glint, such that the elements will appear as if they are actually on, or a part of, the objects being captured.

In at least some embodiments, the user will be able to rotate or tilt the device, and the rendered image, including shadows and/or lighting, will adjust accordingly. For example, in the maze example of FIG. 2, the walls of the maze might be built using a three-dimensional model, such that if the user tilts the device the user might be able to view sides of those walls, as opposed to just the tops of those walls as if viewed orthogonal to the display screen. As the user tilts the device, the relative position of the light source can be tracked using the same detection approaches discussed elsewhere herein, which may be assisted (or replaced) at least in part by other elements, such as accelerometers, gyroscopes or inertial sensors. If the user tilts the device such that a side of a wall is now "facing" the light source, that side might no longer be rendered in shadow, but might be fully lit due to the relative position of the light source. Other adjustments can be made as well, as appropriate.

In the situation where a user is viewing video captured by another device, such as may be connected over a network such as the Internet, the other device might determine and communicate relative lighting information such that any image captured by that other device and transmitted to a user device can have graphical information overlaid that can be lighted or shaded according to the light surrounding the other device, as opposed to the user device. Such an approach can enable the user device to overlay graphical elements over video from remote sources that are shaded according to the lighting near that remote source (so the overlay shading matches the captured video). Similarly, if video was captured at a time in the past, that video could have lighting information stored along with it, or at least associated with the video file, such that at a subsequent point the user device can add graphical elements that are shaded accordingly. For example, an application might allow a user to change the costume on a television character. If the lighting information for that character in an episode was determined and saved, any of a number of different users at different times could change costumes or other such elements that then could be shaded to match the conditions in which the episode was filmed. In another example, where the images were captured in the morning at a tourist site and the user visited the site in the afternoon, the images displayed to user visiting the site in the afternoon would be rendered to reflect the position of the sun in the afternoon.

In a navigational or mapping application, for example, the ability to shade an image based on current conditions can also improve the realism of the image. For example, an application might be able to approximate a relative position of the sun to a certain location, which can be used to render a three-dimensional view of that location with appropriate lighting based on time of day, day of the month, etc. Such an approach, however, will not be able to compensate for changes such as cloudiness, other light sources, etc. For example, a mapping application might overlay information over a building being viewed by the device. In order to properly shade the image of the building, it can be desirable to adjust for the amount of light actually being received from the sun in the current direction. Further, there could be other light sources such as spotlights or stadium lighting that can significantly affect the appearance of the building, which can be captured by the device. In some cases, information such as compass and GPS information can be used to assist in the lighting determinations, in order to obtain a primary direction of the sun at the current place, time and direction even if the sun is blocked by clouds at the present time. Further, if the building is in the shade of a larger building, it can be desirable to shade the building accordingly even though the sun is out and facing a given side of the building.

As discussed, being able to determine the relative position and type of a light source and a relative position of an object being lit by that source enables a 3D model of the environment around a user device. If the user device has more than one camera able to image an object, or has a stereoscopic or other such element, the device can capture three-dimensional information about an object being imaged. For example, the device can capture information about the profile of a person's nose in addition to the shape from a direct view. Thus, not only can the device light the object from a position corresponding to the light source when rendering but can also light any graphical elements according to the actual shape of that object. This information can be utilized with any appropriate graphics program, such as by submitting the information as a request to an Open GL API, whereby the appropriate lighting and shading can be performed using the three-dimensional information.

Being able to generate such a model can have other benefits as well. For example, a user such as a photographer can capture an image of an object such as another person. By being able to determine the direction of lighting, and potentially the intensity and/or other such aspects, the device can determine the location of various shadows or shading and can make adjustments accordingly. For example, the device might be able to utilize an algorithm to remove shadows, highlights, glint or otherwise adjust the brightness or contrast of portions of an image digitally based upon the relative location of the light source. In other embodiments, the device might apply a longer exposure or otherwise perform different capture approaches to areas in low light in order to obtain additional color information. For example, the device can capture a portion of the image that is in the sun with a first set of optical settings and a second portion of the image that is not in the sun with a second set of optical settings. Such a setting could be applied automatically for captured images to minimize or remove shadowing or decrease the variations in intensity, etc.

Such processes also can be used with other applications, such as image or facial recognition. For example, certain facial recognition algorithms have difficulty identifying a person if half of that person's face is covered in shadow. If the device performing the recognition has access to lighting information as discussed elsewhere herein, the device can make any necessary adjustments in order to improve the recognition process. For example, the device can attempt to remove the shadows or analyze based only on that portion that is in the light. In some embodiments, the device can attempt a "mirroring" process whereby any section that is likely covered in shadow can be replaced or merged with similar portions of the other side of that person's face in order to provide the points needed for proper recognition. In some embodiments, at least one front-facing camera can be used to attempt to recognize a current user of the device.

Accordingly, in at least some embodiments it can be desirable to have imaging elements and/or sensors at various positions around the device not only to be able to generate a three-dimensional model of lighting around the device, or at least determine the relative positions of light sources around the device, but also to capture image information in various directions around the device. The desire to include a number of cameras or sensors, however, can increase the cost and/or complexity of the device.

Figure 8:
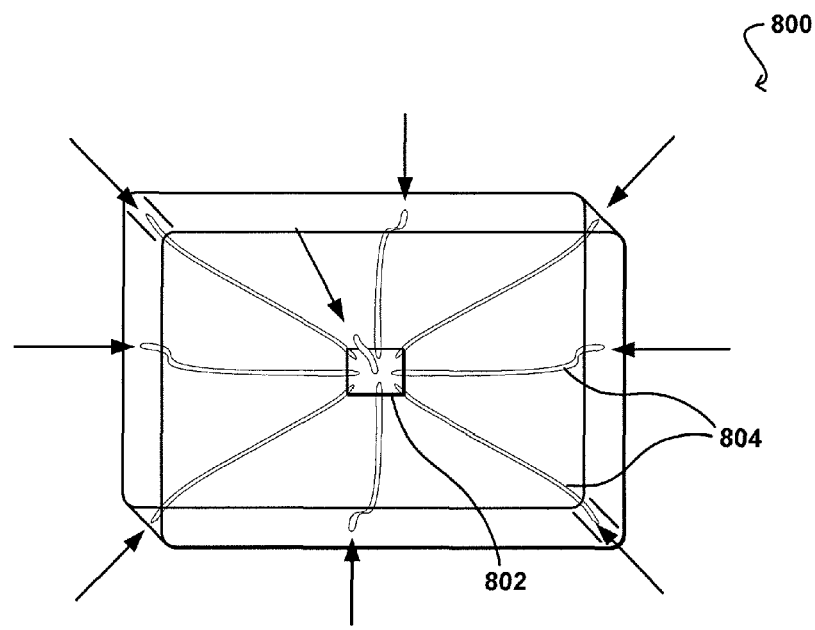
FIG. 8 illustrates an example device utilizing multiple optical paths with a common sensor that can be used in accordance with various embodiments.

FIG. 8 illustrates an example electronic device 800 in accordance with one embodiment that enables light information to be captured from multiple directions using a single sensor. In this example, device 800 includes a light sensor 802. The light sensor can be any appropriate element, such as an ambient light camera or an intensity-detecting sensor array. A number of optical fibers 804, or other such light-transmitting elements, can be positioned such that light transmitted by each fiber is incident on a different portion of the sensor 802. An opposing end of each fiber 804 is positioned at a specific location about the outer surface of the device 800, such that each fiber collects light information from a different range of angles about the device. By knowing the angular range of each fiber and the portion of the sensor corresponding to each fiber, the device can obtain a three-dimensional lighting model indicating the positions of one or more light sources around the device. If there are twelve groups of pixels of the sensor, for example, and each of those twelve groups corresponds to a different fiber, the device can analyze the relative intensities of light from each group of sensors to generate a model of lighting around the device. The sensor thus can be a low resolution camera, for example, that might even be a black and white camera or other low-color or grayscale element.

In some embodiments, the angular range of each fiber at least partially overlaps the range of one or more adjacent fibers, such that interpolation of lighting information between ranges can be improved. In other embodiments, each optical fiber 804 is actually a fiber bundle comprised of multiple individual fibers. Each individual fiber can be tapered or angled at the receiving end, for example, such that each individual fiber of a bundle captures light from a slightly different direction while only running a single bundle to that location. If each individual fiber then directs light to at least one unique pixel, an improved model of surrounding ambient light can be generated based on the additional data points. Such an approach also has the added benefit that none of the main sensors (e.g., cameras) on the device are obscured by an occlusion as discussed elsewhere herein. Further, if the fiber ends are substantially flush with the edge of the device casing there may be no need for lenses or other such elements.

Figure 9:
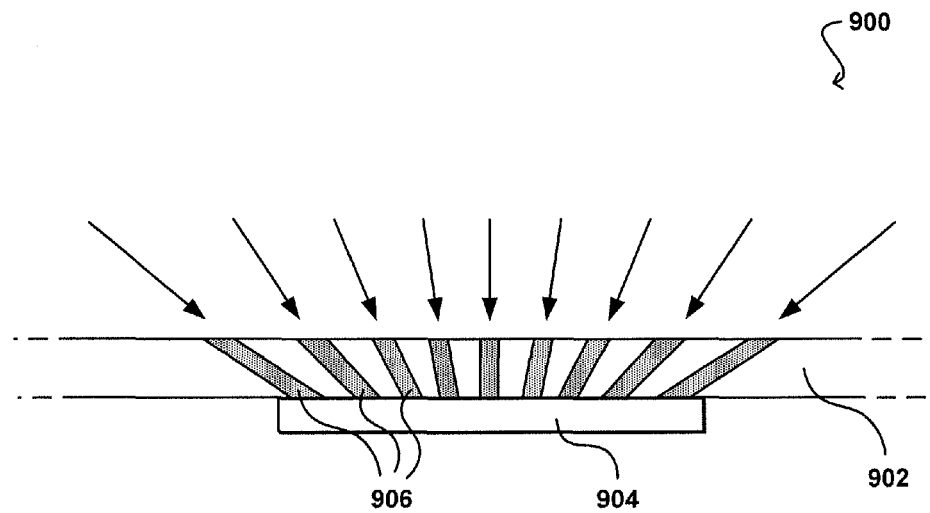
FIG. 9 illustrates an example device including multiple optical paths in a casing of the device that can be used in accordance with various embodiments.

In some embodiments, however, the desire to keep the size of the device as small as possible can outweigh the cost of multiple sensors or other such elements. For example, even though the size of each optical fiber in FIG. 8 might be quite small, the need for space to run multiple fibers to different locations about the device can be undesirable for at least some devices. FIG. 9 illustrates an example of an alternative device 900, wherein there is no need to run optical fibers or other such elements to various places in the device. In this example, a sensor 904 can be adhered to (or at least brought into proximity with) an edge casing 902 of the device 900. A number of light paths 906 can be formed directly into the edge 902 of the device, each at a slightly different angle. These paths can be formed, for example, by mechanical drilling or laser formation, in a plastic, aluminum or other such material of the casing. In some embodiments, these light paths 906 can be filled with a material such as a transmissive plastic or resin, in order to prevent contamination from blocking the paths. For each light path 906, light will be incident from a slightly different optical range, which can be directed to a unique (or at least partially unique) position on the sensor 904 for use in determining a relative intensity of light from each direction. Although the light paths are illustrated along a plane in the figure, it should be understood that the paths can form a two-dimensional array of paths able to capture light from a semi-hemispherical range of angles and direct the light to a two-dimensional array of pixels (e.g., for a VGA chip) or other such configuration of the sensor. Using an approach similar to that discussed above, the device 900 can determine the relative intensity for each light path and can use that information to develop a three-dimensional lighting model. In at least some embodiments, there will be more than one of these sensor/light path elements positioned about the device in order to capture light information from substantially any direction around the device. If the light paths provide sufficient angular range, the device can have two arrays on opposing sides and develop a reasonable model. The light paths can be substantially the thickness of the casing of the device, and thus only primarily the size of the sensor (and any electronic paths or connectors) is added to the interior of the device.

Figure 10:
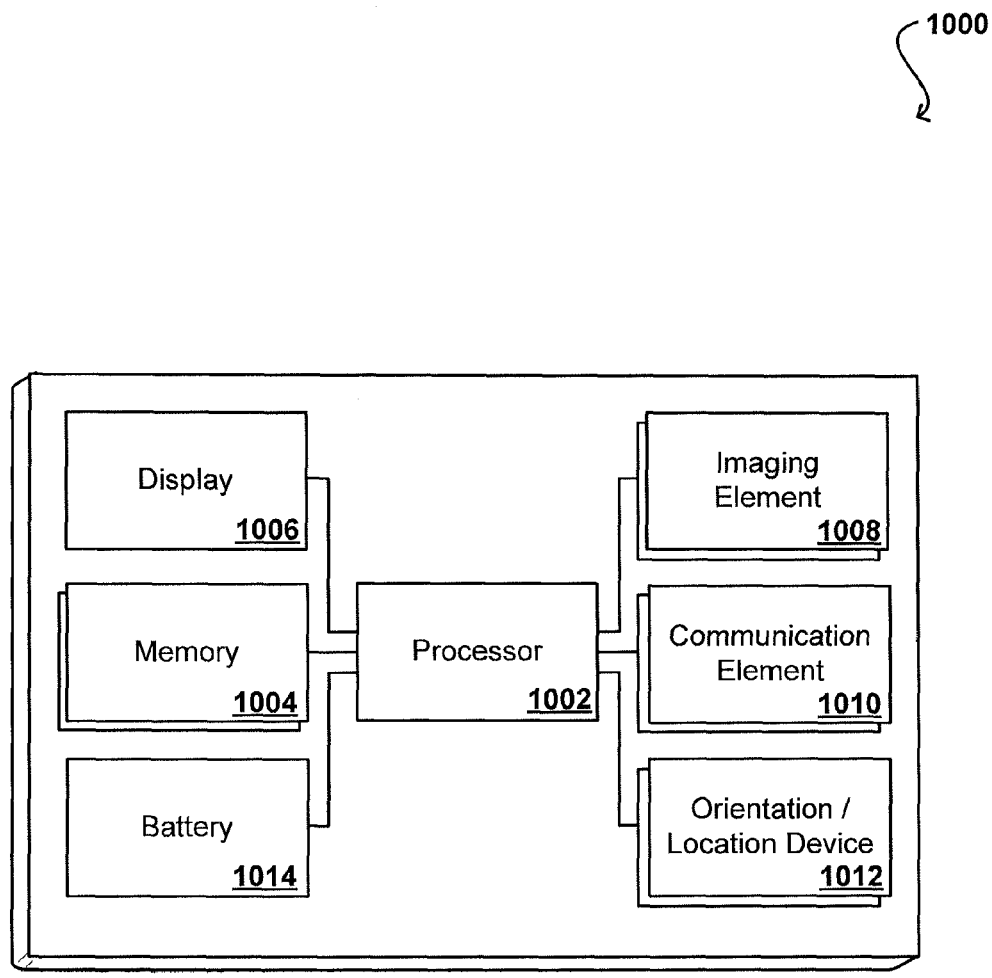
FIG. 10 illustrates example components of an example electronic device that can be used in accordance with various embodiments.

FIG. 10 illustrates a logical arrangement of a set of general components of an example computing device 1000 such as the electronic device 100 described with respect to FIG. 1(*a*). In this example, the device includes at least one processor 1002 for executing instructions that can be stored in a memory device or element 1004. As would be apparent to one of ordinary skill in the art, the device can include many types of memory, data storage or non-transitory computer-readable storage media, such as a first data storage for program instructions for execution by the processor 1002, a separate storage for images or data, a removable memory for sharing information with other devices, etc. The device in this example includes at least one display element 1006, such as an LCD screen, OLED display or electronic paper display. The display element can be at least partially touch sensitive, providing for input through contact with the screen (or a touch sensitive layer in contact therewith). In at least some embodiments, at least a portion of the casing or surfaces other than the display screens can also be touch sensitive. For example, an outer edge or frame of the device might be at least partially able to receive touch input. An IFSR or similar material can be placed about the device such that any appropriate surface or portion can provide for input through contact.

As discussed, the device in many embodiments will include at least one image capture element/sensor 1008 such as a camera, ambient light sensor or infrared sensor that is able to image objects or at least capture light in the vicinity of the device. It should be understood that image capture can be performed using a single image, multiple images, periodic imaging, continuous image capturing, image streaming, etc. Further, a device can include the ability to start and/or stop image capture, such as when receiving a command from a user, application or other device. The device also can include one or more orientation and/or location determining elements 1012, such as an accelerometer, gyroscope, electronic compass or GPS device as discussed above. These elements can be in communication with the processor in order to provide the processor with positioning and/or orientation data.

In some embodiments, the computing device 1000 of FIG. 10 can include one or more sideband or other such communication elements 1010, such as a Wi-Fi, Bluetooth, RF or another wired and/or wireless communication system, enabling the user device to communicate with other devices or components, such as a charger or docking station. In some embodiments the device can include at least one additional input device able to receive conventional input from a user. This conventional input can include, for example, a push button, touch pad, touch screen, wheel, joystick, keyboard, mouse, keypad or any other such device or element whereby a user can input a command to the device. In some embodiments, however, such a device might not include any buttons at all and might be controlled only through a combination of visual and audio commands, such that a user can control the device without having to be in contact with the device. The example device 1000 also includes a battery 1014 or other appropriate power source. The power source can include, for example, at least one rechargeable battery and can include other elements as well such as solar power cells or other such elements.

Figure 11:
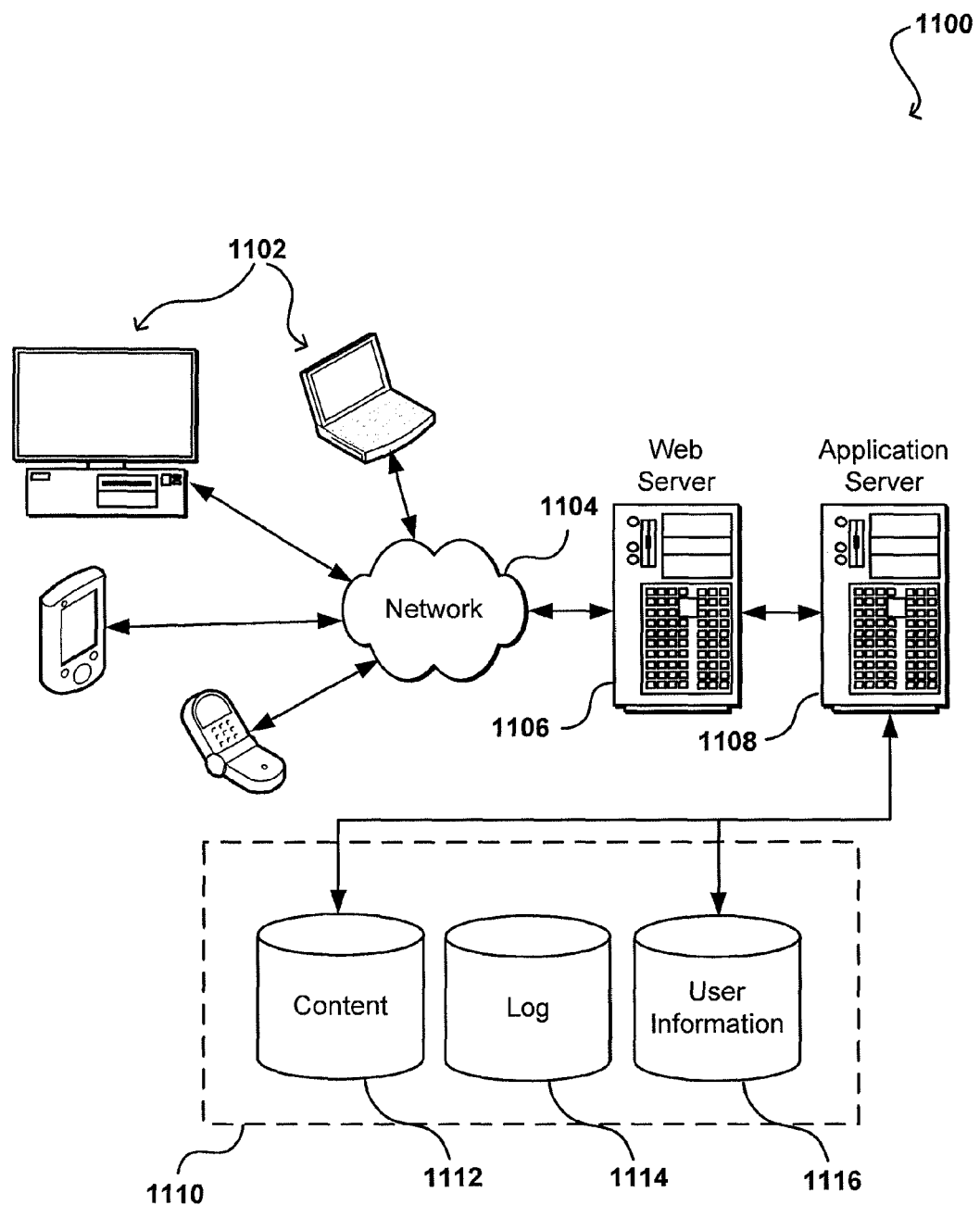
FIG. 11 illustrates an environment in which various embodiments can be implemented.

FIG. 11 illustrates an example of an environment 1100 for implementing aspects in accordance with various embodiments. For example, lighting information captured by a client device might be sent to a remote device or service for processing. As will be appreciated, although a Web-based environment is used for purposes of explanation, different environments may be used, as appropriate, to implement various embodiments. The environment 1100 includes an electronic client device 1102 (e.g., such as device 100 illustrated in FIG. 1), which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1102 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content. The data store also is shown to include a mechanism for storing log data 1114, which can be used for purposes such as reporting and analysis. It should be understood that there can be many other aspects that may need to be stored in the data store, such as for page image information and access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

An environment such as that illustrated in FIG. 11 can be useful for a provider such as an electronic marketplace, wherein multiple hosts might be used to perform tasks such as serving content, authenticating users, performing payment transactions or performing any of a number of other such tasks. Some of these hosts may be configured to offer the same functionality, while other servers might be configured to perform at least some different functions. The electronic environment in such cases might include additional components and/or other arrangements, such as those illustrated in the configuration 200 of FIG. 2, discussed in detail below.

As discussed above, the various embodiments can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) also may be capable of executing programs or scripts in response to requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of displaying an image on an electronic device, comprising:
   determining, using a light sensor, light information from a plurality of substantially straight different light paths of the electronic device, the light paths being configured to capture light from different primary directions with respect to the electronic device and direct the light to the light sensor, and including: an entrance, and an exit;
   determining a light type corresponding to the light information, the light type being one of a point light source or a non-point light source;
   determining a relative intensity value of the light information from the plurality of light paths;
   based at least in part upon the relative intensity value and the primary directions of the light paths, determining light source information including at least a projection direction of a light source relative to the electronic device;
   rendering the image based at least in part on the light information and the light type, the rendering the image including at least one of a lighting process, a shading process and a glint process, wherein the image rendered based on the light type being the point light source is different than a second image that would have been rendered based on the light type being the non-point light source; and
   providing the image for display on the electronic device.

2. The computer-implemented method of claim 1, further comprising:
generating an intensity model using at least the relative intensity value and the primary directions of the light paths, the intensity model representing an intensity of light from a plurality of directions around the device, and the intensity model comprises a three-dimensional model useful in determining intensity information for substantially any direction around the electronic device.

3. The computer-implemented method of claim 1, wherein each entrance of each light path has substantially a same diameter as each exit of each light path.

4. The computer-implemented method of claim 1, wherein determining intensity information for any direction around the electronic device not corresponding to a primary direction of a light path includes interpolating between light intensity values for at least two adjacent primary directions.

5. The computer-implemented method of claim 1, further comprising:
determining a relative location of the light source using the relative intensity values, the relative location including a distance between the electronic device and the light source.

6. A computer-implemented method of providing content for display on an electronic device, comprising:
determine, using a light sensor of the electronic device, light information from a plurality of substantially straight different light paths of the electronic device;
determining a light type corresponding to the light information, the light type being one of a point light source or a non-point light source;
analyzing the light information from the plurality of light paths using the light sensor to determine at least a direction of greatest light intensity relative to the electronic device; and
rendering content for display on the electronic device based at least in part on the direction of greatest light intensity and the light type, wherein the content rendered based on the light type being the point light source is different than a second content that would have been rendered based on the light type being the non-point light source.

7. The computer-implemented method of claim 6, wherein the electronic device is one of a tablet computer, a smart phone, a personal computer, a personal data assistant, portable display, a mobile electronic device and a gaming device.

8. The computer-implemented method of claim 6, further comprising: capturing image information using at least one imaging element of the electronic device.

9. The computer-implemented method of claim 8, wherein the image information is captured using at least two imaging elements, and further comprising:
determining a location of an object in the image information relative to the electronic device;
determining a three-dimensional model for at least one of lighting and shading the at least one object based at least in part upon light intensity information determined for the plurality of light paths and a primary capture direction of each of the light paths; and
rendering graphical information for the object with at least one of lighting and shading based at least in part on the determined three-dimensional model.

10. The computer-implemented method of claim 6, wherein the plurality of light paths include a plurality of optical fibers, each optical fiber having a first end positioned to capture light from a primary direction relative to the electronic device and a second end positioned to direct at least a portion of the captured light to at least one light sensor.

11. The computer-implemented method of claim 10, wherein each of the plurality of optical fibers directs light to a single light sensor of the electronic device.

12. The computer-implemented method of claim 6, wherein the plurality of light paths include at least two sets of light paths separated with respect to a casing of the electronic device, the light paths having a length approximately equal to a thickness of the casing, the light paths directing light to an associated light sensor.

13. The computer-implemented method of claim 12, wherein the light paths comprise a transmissive material formed in a respective opening in the casing.

14. The computer-implemented method of claim 12, wherein each light path in a set of light paths is configured to collect light from a different primary direction.

15. The computer-implemented method of claim 12, wherein each set of light paths forms a two-dimensional array of light paths configured to capture light over a semi-hemispherical range of angles and direct the captured light to a two-dimensional sensor array.

16. The computer-implemented method of claim 6, further comprising: monitoring at least one of an orientation and a position of the electronic device; and
updating at least the direction of greatest light intensity relative to the electronic device based at least in part upon changes in at least one of the orientation and the position of the electronic device.

17. The computer-implemented method of claim 6, further comprising:
storing information for at least the direction of greatest light intensity such that a graphical element generated at a future time is capable of utilizing at least one of lighting and shading based upon at least the direction of greatest light intensity.

18. The computer-implemented method of claim 6, wherein an angular capture range of each light path at least partially overlaps an angular capture range of at least one other light path.

19. The computer-implemented method of claim 6, wherein a subset of the plurality of light paths is formed by a fiber bundle including multiple individual optical fibers, each optical fiber in the fiber bundle being tapered at a receiving end to capture light from a different primary direction.

20. The computer-implemented method of claim 6, further comprising:
rendering the content with penumbral blur based at least in part on the light type.

21. An electronic device, comprising: a processor;
a display;
a plurality of substantially straight different light paths;
a sensor; and
memory including instructions that, when executed by the processor, cause the electronic device to:
determine, using the sensor, light information from the plurality of light paths;
determining a light type corresponding to the light information, the light type being one of a point light source or a non-point light source;
analyze the light information to determine at least a direction of greatest light intensity relative to the electronic device; and render graphical information to be displayed on the display of the electronic device, the render the graphical information including at least one of lighting and shading based at least in part at least the direction of greatest light intensity relative to the electronic device and the light type, wherein the graphical information rendered based on the light type being the point light source is different than a second graphical information that would have been rendered based on the light type being the non-point light source.

22. The electronic device of claim 21, wherein the sensor is one of ambient light camera and an intensity-detecting sensor array.

23. The electronic device of claim 21, wherein the light paths include apertures formed into a casing of the electronic device.

24. The electronic device of claim 21, wherein the apertures are formed using at least one of mechanical drilling or laser processing.

25. The electronic device of claim 21, wherein the instructions when executed further cause the electronic device to:
capture image information using at least two imaging elements;
determine a relative position of an object in the captured image information; determine a three-dimensional model for at least one of lighting and shading the object based at least in part upon the greatest light intensity relative to the electronic device; and
render the graphical information with the captured image information, based at least in part upon the three-dimensional model.

26. The electronic device of claim 21, further comprising: an orientation element; and
wherein the instructions when executed further cause the electronic device to:
monitor an orientation of the electronic device using the orientation element; and
determine a change in light intensity information relative to the electronic device based at least in part upon changes in the orientation of the electronic device.

27. A non-transitory computer-readable storage medium including instructions that, when executed by a processor, cause the processor to:
determine light information from a plurality of light paths using a sensor of an electronic device;
determine a light type corresponding to the light information, the light type being one of a point light source or a non-point light source;
analyze the light information to determine at least a direction of greatest light intensity relative to the electronic device;
render graphical information to be displayed on a display of the electronic device, the render the graphical information including at least one of lighting and shading based at least in part on the direction of greatest light intensity relative to the electronic device and the light type, wherein the graphical information rendered based on the light type being the point light source is different than a second graphical information that would have been rendered based on the light type being the non-point light source; and
store information for at least the direction of greatest light intensity such that a graphical element generated at a subsequent time is enabled to utilize at least one of lighting and shading based at least in part on the direction of greatest light intensity.

28. The non-transitory computer-readable storage medium of claim 27, wherein the instructions when executed further cause the processor to:
capture image information using at least two sensors;
determine a location of an object in the image information relative to the at least two sensors;
determine a three-dimensional model for at least one of lighting and shading the object based at least in part upon the direction of greatest light intensity relative to the electronic device; and
render the graphical information and the image information based at least in part on the three-dimensional model.

29. The non-transitory computer-readable storage medium of claim 28, wherein the sensor is located on the electronic device, the electronic device including a display capable of displaying the rendered graphical information.

30. The non-transitory computer-readable storage medium of claim 27, the electronic device further comprising:
an orientation element, the orientation element enabling the processor to monitor an orientation of the electronic device, and determine a change in light intensity information relative to the electronic device based at least in part upon changes in the orientation of the electronic device.

* * * * *